United States Patent
Kuroiwa et al.

(10) Patent No.: US 8,055,684 B2
(45) Date of Patent: Nov. 8, 2011

(54) CONTENTS-DATA EDITING APPARATUS, METHOD OF UPDATING PLAYLIST OF CONTENTS DATA, AND RECORDING MEDIUM

(75) Inventors: Toshio Kuroiwa, Kanagawa-ken (JP); Masayoshi Nishitani, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 414 days.

(21) Appl. No.: 11/984,590

(22) Filed: Nov. 20, 2007

(65) Prior Publication Data

US 2008/0126427 A1 May 29, 2008

(30) Foreign Application Priority Data

Nov. 24, 2006 (JP) ................................. 2006-316522
Sep. 25, 2007 (JP) ................................. 2007-247191

(51) Int. Cl.
*G06F 17/30* (2006.01)
(52) U.S. Cl. ........................................................ 707/803
(58) Field of Classification Search .................. 707/102, 707/803; 386/69
See application file for complete search history.

(56) References Cited

U.S. PATENT DOCUMENTS

| | | | | |
|---|---|---|---|---|
| 7,212,727 | B2 * | 5/2007 | Senoh | 386/68 |
| 7,356,838 | B2 * | 4/2008 | Madison et al. | 726/10 |
| 7,551,843 | B2 * | 6/2009 | Uesaka et al. | 386/124 |
| 7,562,301 | B1 * | 7/2009 | Wolff et al. | 715/727 |
| 7,668,842 | B2 * | 2/2010 | LaChapelle et al. | 707/999.1 |
| 7,818,350 | B2 * | 10/2010 | New et al. | 707/803 |
| 2007/0047924 | A1 * | 3/2007 | Eklund et al. | 386/125 |
| 2008/0044158 | A1 * | 2/2008 | Kido | 386/83 |

FOREIGN PATENT DOCUMENTS

| | | |
|---|---|---|
| JP | 2002-158971 | 5/2002 |
| JP | 2005-196833 | 7/2005 |

* cited by examiner

*Primary Examiner* — Debbie Le
(74) *Attorney, Agent, or Firm* — Louis Woo

(57) ABSTRACT

Playlists are generated. Each of the generated playlists instructs playback of at least a portion or portions of one or ones selected from contents-data pieces recorded on a recording medium. Playlist management tables are generated. The generated playlist management tables correspond to the contents-data pieces, respectively. Each of the playlist management tables represents a correspondence between related one of the contents-data pieces and a playlist or playlists each instructing playback of at least a portion of the related one of the contents-data pieces. The playlists and the playlist management tables are recorded on the recording medium.

3 Claims, 5 Drawing Sheets

| CONTENTS OF PLAYLIST MANAGE TABLE T1 | | |
|---|---|---|
| NUMBER OF CLIP REF INFO | | 3 |
| CLIP REF INFO CR0 | PLAYLIST ID NUMBER | 1 |
| | PLAY ITEM ID NUMBER | 0 |
| | START PTS | 3000 |
| | END PTS | 363000 |
| CLIP REF INFO CR1 | PLAYLIST ID NUMBER | 2 |
| | PLAY ITEM ID NUMBER | 1 |
| | START PTS | 3000 |
| | END PTS | 93000 |
| CLIP REF INFO CR2 | PLAYLIST ID NUMBER | 3 |
| | PLAY ITEM ID NUMBER | 0 |
| | START PTS | 183000 |
| | END PTS | 273000 |

| CONTENTS OF PLAYLIST MANAGE TABLE T1 | | |
|---|---|---|
| NUMBER OF CLIP REF INFO | | 3 |
| CLIP REF INFO CR0 | PLAYLIST ID NUMBER | 1 |
| | PLAY ITEM ID NUMBER | 0 |
| | START PTS | 3000 |
| | END PTS | 363000 |
| CLIP REF INFO CR1 | PLAYLIST ID NUMBER | 2 |
| | PLAY ITEM ID NUMBER | 1 |
| | START PTS | 3000 |
| | END PTS | 93000 |
| CLIP REF INFO CR2 | PLAYLIST ID NUMBER | 3 |
| | PLAY ITEM ID NUMBER | 0 |
| | START PTS | 183000 |
| | END PTS | 273000 |

FIG. 5

| CONTENTS OF PLAYLIST MANAGE TABLE T1 (AFTER UPDATE) ||  |
|---|---|---|
| NUMBER OF CLIP REF INFO || 3 |
| CLIP REF INFO CR0 | PLAYLIST ID NUMBER | 1 |
| | PLAY ITEM ID NUMBER | 0 |
| | START PTS | 3000 |
| | END PTS | 228000 (UPDATED) |
| CLIP REF INFO CR1 | PLAYLIST ID NUMBER | 2 |
| | PLAY ITEM ID NUMBER | 1 |
| | START PTS | 3000 |
| | END PTS | 93000 |
| CLIP REF INFO CR2 | PLAYLIST ID NUMBER | 3 |
| | PLAY ITEM ID NUMBER | 0 |
| | START PTS | 183000 |
| | END PTS | 228000 (UPDATED) |

FIG. 6

| DATA STRUCTURE OF PLAYLIST PL1 || |
|---|---|---|
| NUMBER OF PLAY ITEMS || 1 |
| PLAY ITEM PI0 | REF CLIP FILE NAME | CLIP FILE CF1 |
| | START PTS | 3000 |
| | END PTS | 363000 |

FIG. 7

| DATA STRUCTURE OF PLAYLIST PL1 (AFTER UPDATE) || |
|---|---|---|
| NUMBER OF PLAY ITEMS || 1 |
| PLAY ITEM PI0 | REF CLIP FILE NAME | CLIP FILE CF1 |
| | START PTS | 3000 |
| | END PTS | 228000 (UPDATED) |

FIG. 8

| DATA STRUCTURE OF PLAYLIST PL3 | | |
|---|---|---|
| NUMBER OF PLAY ITEMS | | 1 |
| PLAY ITEM PI0 | REF CLIP FILE NAME | CLIP FILE CF1 |
| | START PTS | 183000 |
| | END PTS | 273000 |

FIG. 9

| DATA STRUCTURE OF PLAYLIST PL3 (AFTER UPDATE) | | |
|---|---|---|
| NUMBER OF PLAY ITEMS | | 1 |
| PLAY ITEM PI0 | REF CLIP FILE NAME | CLIP FILE CF1 |
| | START PTS | 183000 |
| | END PTS | 228000 (UPDATED) |

CONTENTS-DATA EDITING APPARATUS, METHOD OF UPDATING PLAYLIST OF CONTENTS DATA, AND RECORDING MEDIUM

BACKGROUND OF THE INVENTION

1. Field of the Invention

This invention relates to a recording medium. In addition, this invention relates to a contents-data editing apparatus designed to make a playlist for instructing the playback of one or more selected from a plurality of contents of data stored in a recording medium. Furthermore, this invention relates to a method of updating a playlist.

2. Description of the Related Art

The word "content" used here means, for example, a home movie, a motion picture, a television program, an audio visual stream, or a music tune. Data representing one content is referred to as content data, while data representing a plurality of contents is referred to as contents data. Accordingly, contents data is composed of plural pieces representing respective contents.

In some cases, data representing many contents is recorded on a recording medium such as a DVD, a memory, or a hard disc. Generally, a playlist indicates one or more selected from such contents by a user as an object or objects to be played back. The playlist further indicates the order in which the selected contents should be played back.

Japanese patent application publication number 2002-158971 discloses a system designed so that an AV stream, as an entity of contents, is managed by ClipInformation and reproduction of the AV stream is managed by Playlist. Address information on discontinuity points in the AV stream, information associating the address information and time information in the AV stream with each other, and time information on a characteristic image in the AV stream are recorded in the ClipInformation as attribute information of the AV stream. In the system of Japanese application 2002-158971, a portion of a content data can be designated by a playlist.

Japanese patent application publication number 2005-196833 discloses an audio apparatus including a hard disc for storing music files and a management database, and a device for generating playlists and recording the generated playlists on the hard disc. Ones selected from the music files in the hard disc are registered in the playlists. A set of registered music files varies from playlist to playlist. There may be one or more registered music files common to at least two of the playlists. The music files in the hard disc are assigned serial ID numbers, respectively. The playlists in the hard disc are assigned different ID numbers, respectively. The management database is controlled to indicate the relation of each of the music files in the hard disc with a playlist or playlists in which the present music file is registered. Specifically, the management database holds the ID numbers of the music files in the hard disc. For each of the music-file ID numbers, the management database holds the ID number or numbers of a playlist or playlists in which the music file corresponding to the present music-file ID number is registered. Furthermore, the management database indicates the relation of each of the music files with an address on the hard disc at which the present music file starts.

In the audio apparatus of Japanese application 2005-196833, a music file can be deleted from a playlist or playlists. Specifically, the ID number of a target music file (a music file to be deleted) is derived. The management database is accessed in response to the derived music-file ID number to find a playlist or playlists in which the target music file is registered. Then, the target music file is deleted from the found playlist or playlists.

It is desirable that as content data or a file is edited, a related playlist or playlists are updated accordingly. When the number of the related playlists is relatively large, complicated and troublesome data processing tends to be required for updating the playlists.

An explanation is given of the case where content data stored in a recording medium is captured-image data generated by a video camera and relates with a plurality of playlists in the recording medium. When a later portion representative of wrong captured images is deleted from the content data, the related playlists are read from the recording medium. Regarding each of the read playlists, information about an on-recording-medium position at which the recorded region for the content data ends is updated in accordance with the foregoing deletion. Thus, as the number of the related playlists increases, it takes a considerably longer time to update the related playlists in harmony with the editing of the content data.

SUMMARY OF THE INVENTION

It is a first object of this invention to provide a contents-data editing apparatus which can easily update playlists in accordance with the editing of related content data even when the number of the playlists is relatively large.

It is a second object of this invention to provide a method of easily updating playlists in accordance with the editing of related content data even when the number of the playlists is relatively large.

It is a third object of this invention to provide an improved recording medium.

A first aspect of this invention provides a contents-data editing apparatus comprising means for generating playlists each instructing playback of at least a portion or portions of one or ones selected from contents-data pieces recorded on a recording medium; means for generating playlist management tables corresponding to the contents-data pieces respectively, wherein each of the playlist management tables represents a correspondence between related one of the contents-data pieces and a playlist or playlists each instructing playback of at least a portion of the related one of the contents-data pieces; and means for recording the playlists and the playlist management tables on the recording medium.

A second aspect of this invention is based on the first aspect thereof, and provides a contents-data editing apparatus wherein the playlist generating means and the playlist management table generating means comprise means for specifying at least portions of ones selected from the contents-data pieces through the use of starting point information pieces and ending point information pieces indicating starting points and ending points of the specified at least portions. The apparatus further comprises contents-data updating means for updating at least one of a starting point information piece and an ending point information piece about one selected from the contents-data pieces recorded on the recording medium to update the selected contents-data piece; playlist management table updating means for updating the at least one of the starting point information piece and the ending point information piece in a playlist management table corresponding to the updated contents-data piece when the contents-data updating means updates the at least one of the starting point information piece and the ending point information piece about the selected contents-data piece; and playlist updating means for updating the at least one of the starting point information piece and the ending point information piece in a playlist or playlists each instructing playback of at least a portion of the updated contents-data piece by referring to the playlist management table updated by the playlist management table updating means.

A third aspect of this invention provides a method of updating a playlist of contents-data pieces. The method comprises the steps of updating a playlist instructing playback of at least a portion or portions of one or ones selected from contents-data pieces recorded on a recording medium; updating a playlist management table when the playlist is updated, wherein the playlist management table corresponds to one of the contents-data pieces and represents a correspondence between the corresponding contents-data piece and a playlist or playlists each instructing playback of at least a portion of the corresponding contents-data piece; and recording the updated playlist and the updated playlist management table on the recording medium.

A fourth aspect of this invention is based on the third aspect thereof, and provides a method further comprising the steps of specifying at least portions of ones selected from the contents-data pieces through the use of starting point information pieces and ending point information pieces indicating starting points and ending points of the specified at least portions; updating at least one of a starting point information piece and an ending point information piece about one selected from the contents-data pieces recorded on the recording medium to update the selected contents-data piece; updating the at least one of the starting point information piece and the ending point information piece in a playlist management table corresponding to the updated contents-data piece when the at least one of the starting point information piece and the ending point information piece about the selected contents-data piece is updated; and updating the at least one of the starting point information piece and the ending point information piece in a playlist or playlists each instructing playback of at least a portion of the updated contents-data piece by referring to the updated playlist management table.

A fifth aspect of this invention provides a recording medium storing contents-data pieces; playlists each instructing playback of at least a portion or portions of one or ones selected from the contents-data pieces; and playlist management tables corresponding to the contents-data pieces respectively, wherein each of the playlist management tables represents a correspondence between related one of the contents-data pieces and a playlist or playlists each instructing playback of at least a portion of the related one of the contents-data pieces.

A sixth aspect of this invention provides a file editing apparatus for use with a recording medium storing files and playlists each specifying playback ranges in ones selected from the stored files. The apparatus comprises means for generating playlist management tables corresponding to the stored files respectively, wherein each of the generated playlist management tables represents a relation between corresponding one of the stored files and concerned playlists, out of the stored playlists, each specifying playback ranges including a playback range in the corresponding one of the stored files, and indicates the playback ranges specified by said concerned playlists; means for recording the generated playlist management tables on the recording medium; means for editing one selected from the stored files; means for updating the recorded playlist management table corresponding to the selected file in accordance with the editing of the selected file; means for referring to the playlist management table corresponding to the selected file, and thereby detecting playlists, out of the stored playlists, each specifying playback ranges including a playback range in the selected file; and means for updating the detected playlists in the recording medium in accordance with the editing of the selected file.

A seventh aspect of this invention provides a file editing apparatus for use with a recording medium storing files and playlists each specifying playback ranges in ones selected from the stored files. The apparatus comprises means for generating playlist management tables corresponding to the stored files respectively, wherein each of the generated playlist management tables represents a relation between corresponding one of the stored files and concerned playlists, out of the stored playlists, each specifying playback ranges including a playback range in the corresponding one of the stored files, and indicates the playback ranges specified by said concerned playlists; means for recording the generated playlist management tables on the recording medium; means for receiving a request to edit a file selected from the stored files; means for reading, from the recording medium, a playlist management table corresponding to the selected file; means for referring to the read playlist management table and thereby detecting playlists, out of the stored playlists, each specifying playback ranges including a playback range in the selected file; means for updating the detected playlists in the recording medium in accordance with the request; means for updating the playlist management table, being in the recording medium and corresponding to the selected file, in accordance with the request; and means for editing the selected file in the recording medium in accordance with the request.

This invention has the following advantage. In the case of updating content data (for example, deleting a portion from the content data) in a recording medium, a playlist or playlists affected by the updating can be easily detected by referring to a playlist management table corresponding to the content data.

BRIEF DESCRIPTION OF THE DRAWINGS

FIG. 5 is a diagram showing an example of the contents of the playlist management table which results from updating the playlist management table in FIG. 4.

FIG. 6 is a diagram showing an example of the contents of a playlist in FIG. 3.

FIG. 7 is a diagram showing an example of the contents of the playlist which results from updating the playlist in FIG. 6.

FIG. 8 is a diagram showing an example of the contents of another playlist in FIG. 3.

FIG. 9 is a diagram showing an example of the contents of the playlist which results from updating the playlist in FIG. 8.

DETAILED DESCRIPTION OF THE INVENTION

The word "content" used here means, for example, a home movie, a motion picture, a television program, an audio visual stream, or a music tune. Data representing one content is referred to as content data, while data representing a plurality of contents is referred to as contents data. Accordingly, contents data is composed of plural pieces representing respective contents. In general, contents-data pieces representing respective contents are handled as respective files.

The word "playlist" used here means a playlist itself, a signal representing a playlist, or data representing a playlist. Similarly, the word "playlist management table used here means a playlist management table itself, a signal representing a playlist management table, or data representing a playlist management table. Further, the term "play item" used here means a play item itself, a signal representing a play item, or data representing a play item.

Figure 1:
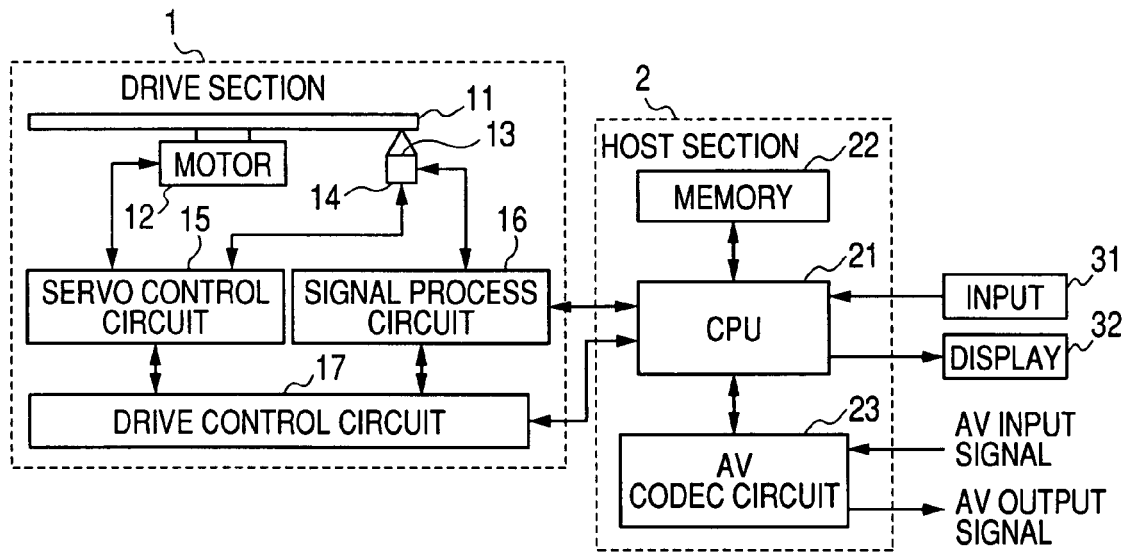
FIG. 1 is a block diagram of a contents-data editing apparatus in an embodiment of this invention.

With reference to FIG. 1, a contents-data editing apparatus in an embodiment of this invention includes a drive section 1 and a host section 2.

The drive section 1 has a spindle motor 12, an optical pickup 13, actuators 14, a servo control circuit 15, a signal processing circuit 16, and a drive control circuit 17.

The drive section 1 serves as a drive device for a recording medium 11. The drive section 1 uses a rewritable DVD as a recording medium 11. The rewritable DVD is, for example, a DVD-RW or a DVD-RAM. The drive section 1 may use a recordable DVD, an HD DVD, or a Blu-ray Disc as a recording medium 11. Alternatively, the drive section 1 may use a memory or a hard disc as a recording medium 11.

Preferably, the recording medium 11 can be removed from the drive section 1, that is, the contents-data editing apparatus.

The DVD 11 is connected with the shaft of the spindle motor 12. The DVD 11 can be rotated by the spindle motor 12. The DVD 11 is scanned by the optical pickup 13 while being rotated. The spindle motor 12 is controlled by the servo control circuit 15 to rotate the DVD 11 at a constant linear velocity concerning the scanning by the optical pickup 13. The optical pickup 13 can be driven by the actuators 14. For the recording and reproduction of data on and from the DVD 11, the signal processing circuit 16 implements modulation and demodulation, and error correction coding and decoding. The servo control circuit 15 and the signal processing circuit 16 are controlled by the drive control circuit 17.

During the reproduction of data from the DVD 11, the optical pickup 13 applies a forward laser beam of a constant intensity to the DVD 11 and converts a reflected laser beam back from the DVD 11 into an electric signal. Since the reflected laser beam contains data read from the DVD 11, the electric signal includes the read data (the reproduced data). The optical pickup 13 feeds the electric signal to the signal processing circuit 16.

During the recording of data on the DVD 11, the optical pickup 13 applies a forward laser beam to the DVD 11 while switching the forward laser beam in response to a signal fed from the signal processing circuit 16 which contains the data.

The servo control circuit 15 controls the actuators 14 simultaneously with the control of the spindle motor 12. The control of the actuators 14 by the servo control circuit 15 is designed to locate the optical pickup 13 relative to the DVD 11 and implement the focusing/tracking control for proper application of the forward laser beam to the DVD 11. The drive control circuit 17 controls the servo control circuit 15 and the signal processing circuit 16, thereby managing the operation of the whole of the drive section 1.

The host section 2 includes a combination of a CPU 21, a memory 22, and an AV (Audio Visual) codec circuit 23. The CPU 21 operates in accordance with a control program (a computer program) stored in the memory 22. The control program is designed to enable the CPU 21 to implement actions mentioned hereafter.

The CPU 21 controls the drive section 1. Specifically, the CPU 21 controls the drive control circuit 17 in the drive section 1. The CPU 21 receives, via the drive section 1, data reproduced from the DVD 11. Specifically, the CPU 21 receives the reproduced data from the signal processing circuit 16 in the drive section 1. The CPU 21 processes the reproduced data. The CPU 21 also processes data to be recorded on the DVD 11. The CPU 21 feeds the resultant to-be-recorded data to the signal processing circuit 16 in the drive section 1.

The CPU 21 is connected with an input device 31 and a display 32. The input device 31 can be operated by the user. The input device 31 includes, for example, operation buttons. User's commands and requests are inputted into the host section 2 as the input device 31 is operated by the user. The CPU 21 receives the inputted user's commands and requests. The CPU 21 generates a video signal representative of information to be indicated. The CPU 21 feeds the generated video signal to the display 32, and controls the display 32 to indicate the information represented by the video signal. The CPU 21 provides an apparatus interface with the user. The memory 22 is used for temporarily storing data processed by the CPU 21.

Usually, the DVD 11 stores contents data. The CPU 21 generates playlists in response to, for example, inputted user's requests. The CPU 21 generates playlist management tables regarding the generated playlists. Each of the generated playlists instructs at least partial playback of one or more arbitrarily selected from pieces of the contents data in the DVD 11. The CPU 21 controls the drive section 1 to record the generated playlists and playlist management tables on the DVD 11. The CPU 21 operates to update contents data in the DVD 11. The CPU 21 further operates to update the playlists and the playlist management tables in the DVD 11.

The AV codec circuit 23 receives an input audio visual signal (an input AV signal) from an external device while being controlled by the CPU 21. The AV codec circuit 23 feeds an output AV signal, which is formed by data reproduced from the DVD 11, to an external device while being controlled by the CPU 21. The AV codec circuit 23 compresses the input AV signal, and multiplexes audio and video components of the compressed AV signal into a clip file (content data). The AV codec circuit 23 feeds the clip file to the CPU 21. The AV codec circuit 23 receives a clip file from the CPU 21. The AV codec circuit 23 separates the received clip file into audio and video components of a compressed AV signal, and expands the compressed AV signal to generate a reproduced AV signal. The AV codec circuit 23 handles the reproduced AV signal as the output AV signal.

Preferably, the DVD 11 stores pieces of audio visual multimedia contents data as clip files respectively.

Figure 2:
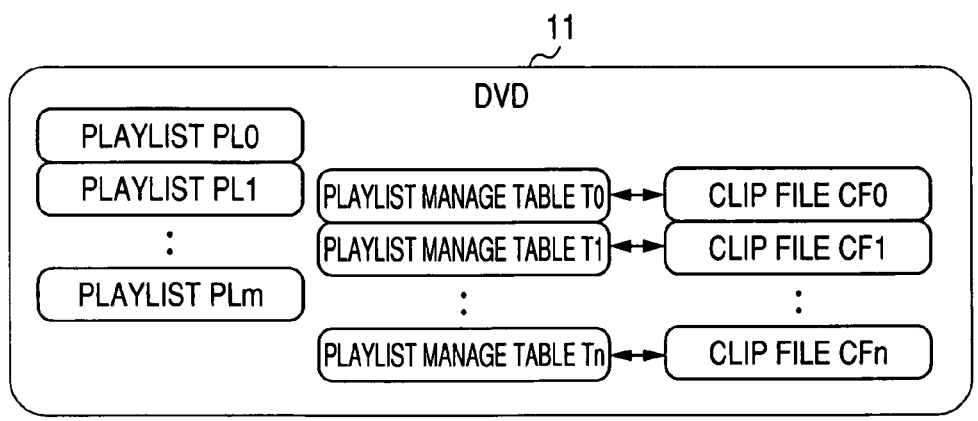
FIG. 2 is a diagram showing the relation among clip files, playlists, and playlist management tables recorded on a DVD in FIG. 1.

As shown in FIG. 2, the DVD 11 stores clip files CF0, CF1, . . . , CFn (that is, contents-data pieces "0", "1", . . . , "n"), where "n" denotes a natural number, and "0", "1", . . . , "n" indicate the ID numbers of the clip files CF0, CF1, . . . , CFn respectively. Furthermore, the DVD 11 stores playlists PL0, PL1, . . . , PLm each in the form of, for example, a file. Here, "m" denotes a natural number, and "0", "1", . . . , "m" indicate the ID numbers of the playlists PL0, PL0, . . . , PLm respectively. Each playlist specifies one or more selected from the clip files CF0, CF1, . . . , CFn as an object or objects to be played back. A specified clip file or files in each playlist are decided in accordance with an inputted user's request. In addition, the DVD 11 stores playlist management tables T0, T1, . . . , Tn each in the form of, for example, a file. Here, "0", "1", . . . , "n" indicate the ID numbers of the playlist management tables T0, T1, . . . , Tn respectively. The playlist management tables T0, T1, . . . , Tn correspond to the clip files CF0, CF1, ..., CFn, respectively. In other words, the playlist management tables T0, T1, ..., Tn are associated with the clip files CF0, CF1, ..., CFn, respectively.

The DVD 11 has a data area and a management area. The clip files CF0, CF1, ..., CFn are located the data area of the DVD 11, whereas the playlists PL0, PL1, ..., PLm and the playlist management tables T0, T1, ..., Tn are placed in the management area thereof. It should be noted that the playlist management tables T0, T1, ..., Tn may be placed in the head portions of the corresponding clip files CF0, CF1, ..., CFn respectively.

Figures 3, 4:
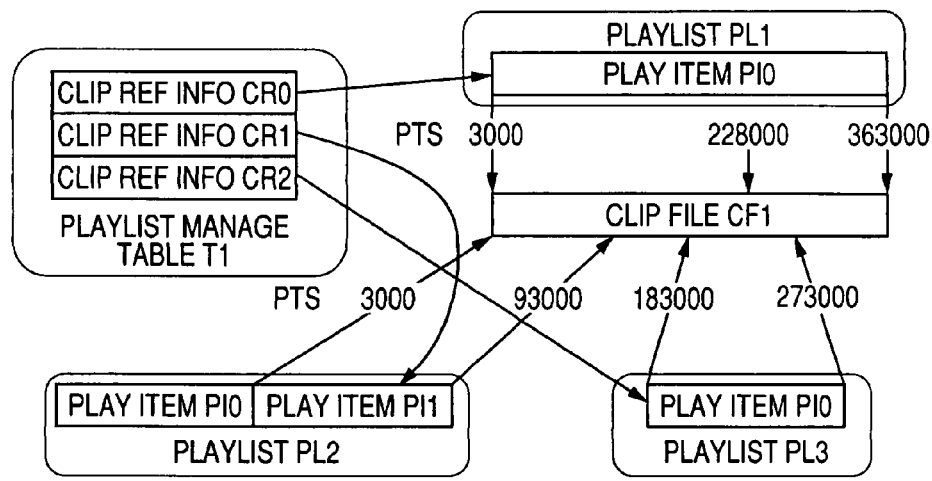
FIG. 3 is a diagram showing an example of the reference relation among a clip file, playlists, play items, and a playlist management table.
FIG. 4 is a diagram showing an example of the contents of the playlist management table in FIG. 3.

FIG. 3 shows an example of a portion of the relation among the clip files CF0, CF1, ..., CFn, the playlists PL1, PL1, ..., PLm, and the playlist management tables T0, T1, ..., Tn.

In FIG. 3, the clip file CF1 is referred to by the playlists PL1, PL2, and PL3. Specifically, the clip file CF1 starts from a PTS (a presentation time stamp) of "3000" and ends at a PTS of "363000". The playlist PL1 refers to the whole of the clip file CF1 as a play item PI0, where "0" indicates the ID number of the play item. The playlist PL2 refers to the portion of the clip file CF1 which extends from a PTS of "3000" to a PTS of "93000" as a play item PI1, where "1" indicates the ID number of the play item PI1. The playlist PI3 refers to the portion of the clip file CF1 which extends from a PTS of "183000" to a PTS of "273000" as a play item PI0.

The playlist PL2 further refers to at least a portion of another clip file (for example, the clip file CF2) as a play item PI0. The playlist PL2 specifies the playback order such that the play items PI0 and PI1 should be sequentially played back in that order.

Each play item PI specifies at least a portion of a clip file CF (that is, the whole or a portion of the clip file CF), which is requested to be played back, through the use of a starting PTS and an ending PTS. Thus, each play item PI specifies a playback portion of or a playback range in the clip file CF.

As previously mentioned, the whole or a portion of a clip file which is referred to by a playlist is defined by two presentation time stamps (starting PTS and an ending PTS, that is, time-related information pieces). Alternatively, the whole or a portion of a clip file may be defined by two recording block addresses or two video frame ID numbers (two video frame serial numbers).

The playlist management tables T0, T1, ..., Tn correspond to the clip files CF0, CF1, ..., CFn, respectively. Each playlist management table is designed to manage a playlist or playlists referring to at least a portion of the corresponding clip file. For the management, each playlist management table uses a clip reference information piece or pieces assigned respectively to the playlist or playlists referring to at least a portion of the corresponding clip file.

In FIG. 3, the playlist management table T1 stores clip reference information pieces CR0, CR1, and CR2 assigned to the playlists PL1, PL2, and PL3 respectively. The clip reference information piece CR0 indicates that the playlist PL1 refers to at least a portion of the clip file CF1 corresponding to the playlist management table T1. The clip reference information piece CR1 indicates that the playlist PL2 refers to at least a portion of the clip file CF1. The clip reference information piece CR2 indicates that the playlist PL3 refers to at least a portion of the clip file CF1. The playlist management table T1 manages the playlists PL1, PL2, and PL3 through the use of the clip reference information pieces CR0, CR1, and CR2.

With reference to FIG. 3, a play item PI means content data identical with at least a portion of a clip file (that is, the whole or a portion of the clip file) which is defined between a starting PTS and an ending PTS.

FIG. 4 shows an example of the contents of the playlist management table T1. As previously mentioned, the playlist management table T1 corresponds to the clip file CF1, and each of the playlists PL1, PL2, and PL3 refers at least a portion of the clip file CF1. The playlist management table T1 is designed for managing the playlists PL1, PL2, and PL3 through the use of the clip reference information pieces CR0, CR1, and CR2 (see FIG. 3).

In FIG. 4, the playlist management table T1 indicates the number of the clip reference information pieces CR0, CR1, and CR2 held therein which is equal to "3", and the contents of the clip reference information pieces CR0, CR1, and CR2.

Clip reference information pieces are assigned to play items, respectively. In FIG. 4, each of the clip reference information pieces CR0, CR1, and CR2 represents the ID number of the corresponding playlist, the ID number of the related play item PI, and the starting PTS and the ending PTS of the portion of the clip file CF1 which is referred to by the corresponding playlist (that is, the starting PTS and the ending PTS indicative of the starting point and the ending point of a playback range in the clip file CF1).

When a play item specifying a playback range in the clip file CF1 is generated, the CPU 21 produces a clip reference information piece CR for the generated play item and adds the produced clip reference information piece CR to the playlist management table T1.

The clip reference information piece CR0 in FIG. 4 corresponds to the play item PI0 of the playlist PL1 in FIG. 3. The clip reference information piece CR0 represents that the ID number of the corresponding playlist PL1 is "1" and the ID number of the related play item PI0 is "0", and the starting PTS and the ending PTS of the playback range in the clip file CF1 (the playback portion of the clip file CF1) are "3000" and "363000" respectively.

The clip reference information piece CR1 in FIG. 4 corresponds to the play item PI1 of the playlist PL2 in FIG. 3. The clip reference information piece CR1 represents that the ID number of the corresponding playlist PL2 is "2" and the ID number of the related play item PI1 is "1", and the starting PTS and the ending PTS of the playback portion of the clip file CF1 are "3000" and "93000" respectively.

The clip reference information piece CR2 in FIG. 4 corresponds to the play item PI0 of the playlist PL3 in FIG. 3. The clip reference information piece CR2 represents that the ID number of the corresponding playlist PL3 is "3" and the ID number of the related play item PI0 is "0", and the starting PTS and the ending PTS of the playback portion of the clip file CF1 are "183000" and "273000" respectively.

With reference to FIGS. 3 and 4, play items PI are reference information directed from playlists PL toward a clip file or files CF, whereas clip reference information pieces CR are reference information directed from a clip file or files CF toward playlists PL. Thus, by referring to playlists PL, play items PI in the playlists PL make it possible to know which of clip files CF are specified, and the order in which at least portions of the specified clip files are designated as playback portions. On the other hand, by referring to a playlist management table T, clip reference information pieces CR in the table T make it possible to detect which of play items PI specify at least portions of a corresponding clip file CF, and which of playlists PL have the detected play items.

The contents-data editing apparatus of FIG. 1, a contents-data recording apparatus, or a contents-data reproducing apparatus reads the playlist management table T1 from the DVD 11 and refers to the read table T1, thereby easily detecting which of play items PI specify playback ranges in the clip file CF1, and which of playlists PL have the detected play items.

Generally, each clip file CF in the DVD 11 can be updated by the contents-data editing apparatus of FIG. 1. For example, a later portion of the clip file CF is deleted so that the ending PTS of the clip file CF is changed to an earlier time point. In this case, the contents-data editing apparatus operates as follows.

User's command is inputted into the CPU 21 in the contents-data editing apparatus as the input device 31 is operated by the user. It is assumed that the inputted user's command is a request to delete the later portion of the clip file CF1 which starts from a PTS of "228000", that is, delete the portion between a PTS of "228000" and a PTS of "363000" from the clip file CF1. The inputted user's command includes an information piece indicating the to-be-deleted range in the clip file CF1, that is, the portion of the clip file CF1 which is requested to be deleted. The inputted user's command relates to the clip file CF1, and therefor includes an information piece indicating the ID number of the clip file CF1.

The CPU 21 derives the ID number of the clip file CF1 from the inputted user's command. The CPU 21 identifies the playlist management table T1 having an ID number equal to the derived ID number of the clip file CF1. In other words, the CPU 21 identifies the playlist management table T1 corresponding to the clip file CF1. Then, the CPU 21 controls the drive control circuit 17 so that the optical pickup 13 will read the playlist management table T1 from the management area of the DVD 11. The read playlist management table T1 propagates from the optical pickup 13 to the CPU 21 through the signal processing circuit 16. The CPU 21 stores the read playlist management table T1 into the memory 22.

Next, the CPU 21 sequentially accesses clip reference information pieces CRi (i=0, 1, 2, . . . ) in the playlist management table T1 in the memory 22. For each clip reference information piece CRi, the CPU 21 detects the playback range defined between a starting PTS and an ending PTS represented by the clip reference information piece CRi. The CPU 21 derives the to-be-deleted range from the inputted user's command. Then, the CPU 21 compares the detected playback range and the derived to-be-deleted range to decide whether or not the playback range contains the to-be-deleted range. When the playback range contains the to-be-deleted range, the CPU 21 updates the clip reference information piece CRi so that the to-be-deleted range will be excluded from the playback range specified by the updated clip reference information piece CRi. The playlist management table T1 in the memory 22 is updated in accordance with the updating of the clip reference information piece CR1. When the playback range does not contain the to-be-deleted range, the CPU 21 holds the clip reference information piece CRi unchanged.

Thereafter, the CPU 21 transfers the updated playlist management table T1 from the memory 22 to the signal processing circuit 16 and controls the drive control circuit 17 so that the optical pickup 13 will write the updated playlist management table T1 over the old one in the management area of the DVD 11. It should be noted that the updated playlist management table T1 propagates from the signal processing circuit 16 to the optical pickup 13. The CPU 21 controls the drive control circuit 17 in response to the to-be-deleted range so that the optical pickup 13 will delete the portion between a PTS of "228000" and a PTS of "363000" from the clip file CF1 in the data area of the DVD 11.

A detailed description will now be given of operation of the CPU 21 which occurs when the playback range contains the to-be-deleted range for each clip reference information piece CRi. The CPU 21 updates the clip reference information piece CRi in the playlist management table T1 in the memory 22 so that the to-be-deleted range will be excluded from the playback range specified by the updated clip reference information piece CRi. Specifically, the CPU 21 changes an ending PTS represented by the clip reference information piece CRi to "228000". For example, as shown in FIGS. 4 and 5, the CPU 21 changes the ending PTS represented by the clip reference information piece CR0 from "363000" to "228000". Furthermore, the CPU 21 changes the ending PTS represented by the clip reference information piece CR2 from "273000" to "228000".

Next, the CPU 21 refers to the playlist management table T1 in the memory 22, and thereby detects the playlist ID number and the play item ID number represented by each clip reference information piece CRi in the playlist management table T1. The CPU 21 controls the drive control circuit 17 in response to the detected playlist ID number so that the optical pickup 13 will read, from the management area in the DVD 11, the playlist having an ID number equal to the detected one. The read playlist propagates from the optical pickup 13 to the CPU 21 through the signal processing circuit 16. The CPU 21 stores the read playlist into the memory 22. The CPU 21 searches the playlist in the memory 22 in response to the detected play item ID number for a play item having an ID number equal to the detected one. The CPU 21 updates the search-result play item in response to the to-be-deleted range so that the to-be-deleted range will be excluded from the playback range specified by the updated play item. For example, as shown in FIGS. 6 and 7, the CPU 21 changes the ending PTS specified by the play item PI0 in the playlist PL1 from "363000" to "228000". Furthermore, as shown in FIGS. 8 and 9, the CPU 21 changes the ending PTS specified by the play item PI0 in the playlist PL3 from "273000" to "228000". The playlist in the memory 22 is updated in accordance with the updating of the search-result play item. The CPU 21 transfers the updated playlist from the memory 22 to the signal processing circuit 16 and controls the drive control circuit 17 so that the optical pickup 13 will write the updated playlist over the old one in the management area of the DVD 11. It should be noted that the updated playlist propagates from the signal processing circuit 16 to the optical pickup 13.

According to the deletion of the portion between a PTS of "228000" and a PTS of "363000" from the clip file CF1, the ending PTS represented by the clip reference information piece CR0 in the playlist management table T1 is changed from "363000" to "228000" (see FIGS. 4 and 5). Furthermore, the ending PTS represented by the clip reference information piece CR2 in the playlist management table T1 is changed from "273000" to "228000" (see FIGS. 4 and 5). In addition, the ending PTS specified by the play item PI0 in the playlist PL1 is changed from "363000" to "228000" (see FIGS. 6 and 7). Furthermore, the ending PTS specified by the play item PI0 in the playlist PL3 is changed from "273000" to "228000" (see FIGS. 8 and 9).

Thus, in the case of the deletion of a portion from the clip file CF1 on the DVD 11, the playlist management table T1 and the related play items PI on the DVD 11 are updated in accordance with the deletion to provide or maintain conformity between the play items PI in all the playlists PL and the clip reference information pieces CR in the playlist management table T1. Specifically, the starting PTSs and the ending PTSs related with the deletion are updated accordingly on a batch processing basis.

Figure 10:
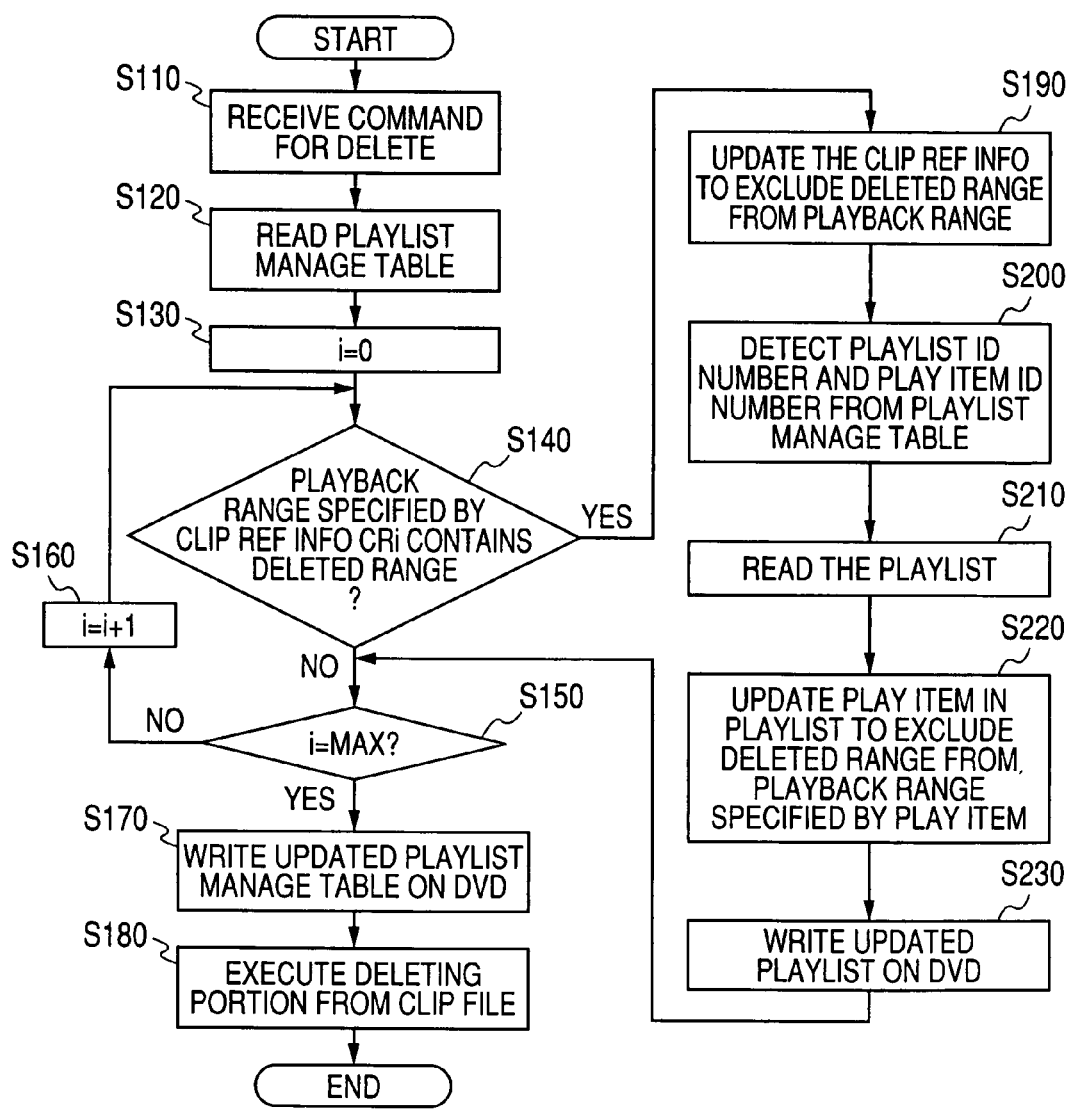
FIG. 10 is a flowchart of a control program for a CPU in FIG. 1.

FIG. 10 is a flowchart of a segment of the control program for the CPU 21. The program segment in FIG. 10 relates to the deletion of a portion from a clip file CF (for example, the clip file CF1).

With reference to FIG. 10, a first step S110 of the program segment waits for an inputted user's command which is a request to delete a portion from the clip file CF1. When such an inputted user's command arrives, the program advances from the step S110 to a step S120.

The step S120 derives the ID number of the clip file CF1 from the inputted user's command. The step S120 identifies the playlist management table T1 having an ID number equal to the derived ID number of the clip file CF1. In other words, the step S120 identifies the playlist management table T1 corresponding to the clip file CF1. Then, the step S120 controls the drive control circuit 17 so that the optical pickup 13 will read the playlist management table T1 from the management area of the DVD 11. The read playlist management table T1 propagates from the optical pickup 13 to the CPU 21 through the signal processing circuit 16. The step S120 stores the read playlist management table T1 into the memory 22.

A step S130 following the step S120 sets a variable "i" to "0". The value "i" denotes an ID number for a clip reference information piece CR. After the step S130, the program advances to a step S140.

The step S140 accesses a clip reference information piece CRi which is in the playlist management table T1 in the memory 22, and which has an ID number equal to the value "i". The step S140 detects the playback range defined between a starting PTS and an ending PTS represented by the accessed clip reference information piece CRi. The step S140 derives the to-be-deleted range from the inputted user's command. Then, the step S140 compares the detected playback range and the derived to-be-deleted range to decide whether or not the playback range contains the to-be-deleted range. When the playback range contains the to-be-deleted range, the program advances from the step S140 to a step S190. Otherwise, the program advances from the step S140 to a step S150.

The step S150 decides whether or not the value "i" is equal to the greatest (maximum) among the ID numbers of all the clip reference information pieces CR in the playlist management table T1 in the memory 22. When the value "i" is equal to the greatest ID number, the program advances from the step S150 to a step S170. Otherwise, the program advances from the step S150 to a step S160.

The step S160 increments the value "i" by "1". After the step S160, the program returns to the step S140.

The step S190 updates the clip reference information piece CRi in the playlist management table T1 in the memory 22 so that the to-be-deleted range will be excluded from the playback range specified by the updated clip reference information piece CRi. Specifically, the step S190 changes at least one of a starting PTS and an ending PTS represented by the clip reference information piece CRi. The playlist management table T1 in the memory 22 is updated in accordance with the updating of the clip reference information piece CRi.

A step S200 following the step S190 refers to the playlist management table T1 in the memory 22, and thereby detects the playlist ID number and the play item ID number represented by the clip reference information piece CRi in the playlist management table T1.

A step S210 subsequent to the step S200 controls the drive control circuit 17 in response to the detected playlist ID number so that the optical pickup 13 will read, from the management area in the DVD 11, the playlist having an ID number equal to the detected one. The read playlist propagates from the optical pickup 13 to the CPU 21 through the signal processing circuit 16. The step S210 stores the read playlist into the memory 22.

A step S220 following the step S210 searches the playlist in the memory 22 in response to the detected play item ID number for a play item having an ID number equal to the detected one. The step S220 updates the search-result play item in response to the to-be-deleted range so that the to-be-deleted range will be excluded from the playback range specified by the updated play item. Specifically, the step S220 changes at least one of the starting PTS and the ending PTS specified by the search-result play item. The playlist in the memory 22 is updated in accordance with the updating of the search-result play item.

A step S230 subsequent to the step S220 transfers the updated playlist from the memory 22 to the signal processing circuit 16 and controls the drive control circuit 17 so that the optical pickup 13 will write the updated playlist over the old one in the management area of the DVD 11. It should be noted that the updated playlist propagates from the signal processing circuit 16 to the optical pickup 13. After the step S230, the program advances to the step S150.

The step S170 transfers the updated playlist management table T1 from the memory 22 to the signal processing circuit 16 and controls the drive control circuit 17 so that the optical pickup 13 will write the updated playlist management table T1 over the old one in the management area of the DVD 11. It should be noted that the updated playlist management table T1 propagates from the signal processing circuit 16 to the optical pickup 13.

A step S180 following the step S170 controls the drive control circuit 17 in response to the to-be-deleted range so that the optical pickup 13 will delete, from the clip file CF1 in the data area of the DVD 11, the portion corresponding to the to-be-deleted range. After the step S180, the current execution cycle of the program segment ends.

Features of the operation of the contents-data editing apparatus in FIG. 1 are as follows. The playlist management tables T0, T1, . . . , Tn correspond to the clip files CF0, CF1, . . . , CFn, respectively. By looking into a playlist management table corresponding to a clip file requested to be partially deleted, it is easy to detect a playlist or playlists referring to the clip file. The starting PTSs and the ending PTSs represented by clip reference information pieces CR in the playlist management table, and the starting PTSs and the ending PTSs specified by play items in the playlist or playlists are updated in accordance with the deletion of a portion from the clip file. The updating provides or maintains conformity between the play items in the playlist or playlists and the clip reference information pieces CR in the playlist management table. It is possible to simplify the signal processing for the deletion of a portion from the clip file.

The contents-data editing apparatus of FIG. 1 generates a playlist or playlists each instructing at least partial playback of one or more arbitrarily selected from pieces of contents data in the DVD 11. The contents-data pieces are handled as clip files, respectively. Each playlist instructs at least partial playback of one or more arbitrarily selected from the clip files. The apparatus further generates playlist management tables corresponding to the clip files respectively. Each of the generated playlist management tables represents the relation between the corresponding clip file and a playlist or playlists instructing at least partial playback of the corresponding clip file. The apparatus records the generated playlist or playlists and the generated playlist management tables on the DVD 11. Regarding the editing of a clip file in the DVD 11 (for example, the deletion of a portion from a clip file in the DVD 11), reference to a playlist management table corresponding to the clip file makes it possible to easily detect a playlist or playlists affected by the editing. Therefore, even in the case of many playlists recorded on the DVD 11, a desired playlist or playlists can be updated in accordance with the editing of a clip file on a batch processing basis.

At least a portion of each of contents-data pieces in the DVD 11 is defined as a playback portion (a playback range) by a starting point information piece and an ending point information piece such as a starting PTS and an ending PTS. As at least one of a starting point information piece and an ending point information piece defining a playback portion of a contents-data piece in the DVD 11 is updated, at least one of a starting point information piece and an ending point information piece in a playlist management table corresponding to the contents-data piece is updated accordingly. In addition, by looking into the playlist management table, at least one of a starting point information piece and an ending point information piece in each of playlists referring to the contents-data piece is updated accordingly. Regarding the editing of a contents-data piece in the DVD 11 (for example, the deletion of a portion from a contents-data piece in the DVD 11), reference to a playlist management table corresponding to the contents-data piece makes it possible to easily detect a playlist or playlists affected by the editing. Accordingly, it is unnecessary to check all playlists and all play items therein to decide whether or not each of the playlists is affected by the editing, and whether or not each of the play items is affected by the editing. Therefore, the signal processing for the editing can be high in rate (speed). This advantage is more notable in the case of many playlists recorded on the DVD 11 or in the case of many play items in each of playlists.

The DVD 11 may be replaced by an HD DVD, a Blu-ray Disc, a memory, or a hard disc. The contents-data editing apparatus of FIG. 1 can be used in a video camera, an HDD recorder, a DVD recorder, an HD DVD recorder, a Blu-ray Disc recorder, or a memory recorder including the above-indicated recording medium. The contents-data editing apparatus of FIG. 1 can record captured-image data, television-program data, or music data on the recording medium 11 as a clip file, that is, a contents-data piece. A clip file can be referred to by a playlist or playlists. The contents-data editing apparatus of FIG. 1 is effective in editing a clip file.

The updating of a clip file may include changing the starting PIES of the clip file and thereby deleting a former portion therefrom, deleting the whole of the clip file, or deleting an intermediate portion from the clip file. In addition, the updating of a clip file may include editing the clip file to change the contents thereof or to add new contents thereto.

The signal processing for deleting a former portion from a clip file by changing the starting PTS thereof is basically similar to the signal processing for deleting a later portion from a clip file by changing the ending PTS thereof except that the starting PTS is processed instead of the ending PTS.

In the case of the deletion of the whole of a clip file, the playlist management table corresponding to the clip file is deleted while play items for the clip file are also deleted from playlists referring to at least portions of the clip file. It is preferable that the playlist management table corresponding to the clip file is referred to and thereby the play items for the clip file are deleted from the related playlists before the playlist management table is deleted. Thus, it is preferable that the updating of the playlists is implemented before the deletion of the playlist management table. In this case, the updating of the playlists can be easily performed on a batch processing basis.

The deletion of an intermediate portion from a clip file causes the clip file to be divided, and hence results in a change from one related play item to two related play items. Accordingly, clip reference information pieces are added to the playlist management table corresponding to the clip file, and play items are added to playlists each referring to at least a portion of the division-result clip file. In this case, by looking into the playlist management table, the updating of the playlists referring to at least portions of the clip file can be easily performed on a batch processing basis.

What is claimed is:

1. A contents-data editing apparatus comprising:
   means for generating playlists each instructing playback of an arbitrary portion or portions of one or ones selected from a contents-data piece or pieces recorded on a recording medium through the use of a first section information piece or pieces consisting of a first starting point information piece or pieces and a first ending point information piece or pieces indicating a starting point or points and an ending point or points of said arbitrary portion or portions, the playlists being assigned different identification information pieces respectively;
   means for generating a playlist management table or tables corresponding to the contents-data piece or pieces respectively, wherein the playlist management table or tables each indicate identification information pieces for playlists each instructing playback of an arbitrary portion of a corresponding contents-data piece;
   means for recording the playlists and the playlist management table or tables on the recording medium;
   means for detecting a playlist management table corresponding to a contents-data piece from which a part has been deleted;
   means for referring to the detected playlist management table and thereby identifying a first section information piece or pieces which are used by one or more of playlists related to identification information pieces indicated by the detected playlist management table and which are required to be updated in accordance with the deletion of the part from the contents-data piece; and
   playlist updating means for updating the identified first section information piece or pieces in accordance with the deletion of the part of the contents-data piece.

2. A contents-data editing method comprising the steps of:
   generating playlists each instructing playback of an arbitrary portion or portions of one or ones selected from a contents-data piece or pieces recorded on a recording medium through the use of a first section information piece or pieces consisting of a first starting point information piece or pieces and a first ending point information piece or pieces indicating a starting point or points and an ending point or points of said arbitrary portion or portions, the playlists being assigned different identification information pieces respectively;
   generating a playlist management table ortables corresponding to the contents-data piece or pieces respectively, wherein the playlist management table or tables each indicate identification information pieces for playlists each instructing playback of an arbitrary portion of a corresponding contents-data piece;
   recording the playlists and the playlist management table or tables on the recording medium;
   detecting a playlist management table corresponding to a contents-data piece from which a part has been deleted;
   referring to the detected playlist management table and thereby identifying a first section information piece or pieces which are used by one or more of playlists related to identification information pieces indicated by the detected playlist management table and which are required to be updated in accordance with the deletion of the part from the contents-data piece; and updating the identified first section information piece or pieces in accordance with the deletion of the part of the contents-data piece.

3. A contents-data editing apparatus comprising:

means for generating playlists each instructing playback of an arbitrary portion or portions of one or ones selected from a contents-data piece or pieces recorded on a recording medium through the use of a first section information piece or pieces consisting of a first starting point information piece or pieces and a first ending point information piece or pieces indicating a starting point or points and an ending point or points of said arbitrary portion or portions, the playlists being assigned different identification information pieces respectively;

means for generating a playlist management table or tables corresponding to the contents-data piece or pieces respectively, wherein the playlist management table or tables each indicate reference information pieces including identification information pieces for playlists each instructing playback of an arbitrary portion of a corresponding contents-data piece, and the reference information pieces each include a second section information piece or pieces consisting of a second starting point information piece or pieces and a second ending point information piece or pieces indicating a starting point or points and an ending point or points in the corresponding contents-data piece;

means for recording the playlists and the playlist management table or tables on the recording medium;

means for detecting a playlist management table corresponding to a contents-data piece from which a part has been deleted;

means for referring to the detected playlist management table and thereby identifying a second section information piece or pieces which are in one or more of reference information pieces indicated by the detected playlist management table and which are required to be updated in accordance with the deletion of the part from the contents-data piece; and playlist updating means for updating the identified second section information piece or pieces in accordance with the deletion of the part of the contents-data piece, and for updating a first section information piece or pieces used by one or more of playlists related to identification information pieces in the reference information pieces indicated by the detected playlist management table in accordance with the updating of the identified second section information piece or pieces.

* * * * *